UNITED STATES PATENT OFFICE.

CARLETON ELLIS, OF LARCHMONT, NEW YORK.

FERTILIZER.

976,793.  Specification of Letters Patent.  Patented Nov. 22, 1910.

No Drawing.   Application filed October 14, 1908.  Serial No. 457,635.

*To all whom it may concern:*

Be it known that I, CARLETON ELLIS, a citizen of the United States, residing at Larchmont, in the county of Westchester and State of New York, have invented certain new and useful Improvements in Fertilizers, of which the following is a specification.

This invention relates to fertilizers and relates particularly to granular fertilizing mixtures having the property when placed in soil of feeding plant roots with proper and regulated amounts of fertilizing elements.

The object of this invention is to combine soluble fertilizing salts, such for example as the nitrates and phosphates of ammonia and potash, with cementitious material to produce a granular mass from which the aforesaid soluble salts will be not easily leached by the action of water, so that when the fertilizer is applied to the soil the fertilizing elements are prevented from being rapidly washed out of the fertilizer in damp weather, but will be delivered from the granules to the soil in a gradual way and in an assimilable form and over a long period of time, so that the soil may never carry fertilizing elements under normal conditions to exceed the isotonic strength.

It is further the object of this invention to provide a fertilizer containing a compound capable of depressing or neutralizing the action of toxic bodies which often form in the soil and accumulate to such an extent as to render the soil infertile. Heretofore it popularly has been supposed that lack of productivity meant soil deficient in the standard fertilizing elements potash, phosphorus or nitrogen. Recent investigations have shown that a soil may be replete with these fertilizing elements and still be unproductive. It has further developed that by the decay of vegetation or decomposition of animal refuse such as is often found in common fertilizers a series of poisons generally of a nitrogenous character is produced. Prominently among these are the compounds of pyridin and its isomers such as picolin, lutidin, etc. For instance an acid derivative of picolin, namely, picolin dicarboxylic acid and an associated acid uvitonic acid commonly present in infertile soils have a marked inhibiting action on plant growth acting as it were just as arsenic does on the human organism. Other toxic bodies, too, of a different chemical character such as dihydroxystearic acid and the like are often generated in certain types of soils and constitute a serious menace to the tiller of the soil. No matter how thoroughly the soil may be fertilized yet for some supposedly mysterious reason a particular patch or tract of land does not afford yields commensurate with the labor and treatment expended on it. The formation of toxic bodies which poison plant life is the explanation of this unproductive soil-condition.

While certain mineral salts particularly sodium nitrate and calcium carbonate aid to some extent in repressing the increase in toxic bodies they are by no means positive in their action. In the present invention, it is sought to employ the above mentioned mineral salts for what fertilizing, soil-sweetening and antidotal action they may possess and to incorporate in the fertilizer a positive antidote, capable of nullifying the poisonous effect of the aforesaid toxic principles. Such antidotes are found in certain organic bodies such as alpha naphthylamin, specially treated bone black, pyrogallol and particularly the compounds of formic acid such as formate of calcium or ammonium.

My invention involves the combination of soluble and readily assimilable fertilizing salts with cementitious material and in granulating and allowing to harden or in first hardening and then granulating, so as to produce granules of about the size of the pea.

The soluble fertilizing salts which I may employ include ammonium salts, such as, sulfate, nitrate and phosphate of ammonia and the similar compounds of potash. Of course, other potash salts, such as, kainit and the like may be employed. Among the phosphorus containing compounds I may make use of ordinary acid phosphate of lime, or better, the double super-phosphate as well as phosphates of other bases. Inasmuch as I prefer to make an odorless composition preferably free from organic matter, such as tankage and products of the abattoirs, I prefer to make my composition largely or entirely of clean substantially odorless mineral salts which are readily assimilable and easily soluble. It is well known that sodium nitrate, or Chile saltpeter, is an excellent stimulant for plant life. In the form of nitrate, plant rootlets can readily absorb or assimilate nitrogen. This is not true of ammonium sulfate, which has to undergo the action of nitrifying bacteria in the soil before it becomes assimilable. The process of nitrification consumes more or less time depending on the bacterial condition of the soil, or should heavy rains ensue after application of ammonium sulfate fertilizer and before nitrification is well under way, the ammonium sulfate may be to a very considerable extent washed out of the soil and wasted. On account of the powerful oxidizing effect of sodium nitrate, its presence in organic fertilizers is dangerous when intimately incorporated with organic bodies such as peat as it tends to form extremely combustible compositions. I have endeavored in the present invention to make use of the remarkable stimulating properties of sodium nitrate in such a way that this compound cannot be used in quantities dangerous to plant growth and so compounded with a proper carrier, as to be entirely incombustible and free from all risk of fire, etc. In this manner I am able to do away with the slower acting ammonium sulfate and make use of the highly beneficial and stimulating sodium nitrate. It should be further emphasized that the use of plain sodium nitrate without means for repressing its solubility is fraught with great danger to plant life, as has been attested by numerous experiments and trials. In the present invention I have made an important advance in the art in that I have made sodium nitrate safe to use for general fertilizing purposes.

As the cementing material I prefer to use hydraulic or Portland cement, but may make use of other cementitious bodies, such as calcined sulfate of lime, Sorel cement, clays, etc. It is my object to so incorporate the cementing material that it acts as a granular support or carrier for the soluble fertilizing salts, from which granule the salts may gradually leach when in contact with moisture, eventually leaving the cementitious material as a porous granule, or skeleton, which has a peculiar beneficent effect to the soil, as it sweetens and porosifies the soil, acts as an anti-clog and aids in bringing about that condition of "tilth" or "soil-crumb" formation which is so requisite for the most successful growth of plants. Moreover soil which has become badly clogged by the use of ordinary fertilizers is quickly opened and rectified thereby. It will be evident that although I make my composition in a granular form and although the fertilizing elements are liberated slowly when the composition is applied, yet I accomplish this result without sealing the granular carrier, and thereby obviate the expense of such an operation.

A suitable composition may be secured by mixing fifteen pounds of double super-phosphate of lime containing about 40% of phosphoric acid, free and combined, with twenty pounds sodium nitrate, ten pounds potassium sulfate and five pounds trisodium phosphate. This mixture is moistened with a little water and stirred and fifty pounds of Portland cement then introduced. The mixture is well agitated, additional water being added, if necessary, so as to produce a mass about as moist as wet sand; this is passed through a granulating machine so as to give the composition a granular form. As the mixture leaves the granulator it may be thrown on a plate conveyer passing through a drying chamber so as to remove the moisture, or may first be allowed to set and then dried, or instead of passing the mixture through a granulating machine, the mass may be allowed to solidify and subsequently be passed through a crusher and coarse grinder. The crushed mass containing coarse and fine particles may be used as it stands, or may be screened; the fine, or dust-like, material being returned to the mixer, if desired, to be incorporated with a subsequent batch.

If it be desired to introduce humus into my composition, I may add granular peat, for example, which preferably is coated with clay, kaolin or carbonate of lime. To effect this coating I may mix eighty pounds of peat with twenty pounds of carbonate of lime, moisten with water, agitate and dry. This coated peat is then added to the well dried granular material containing the fertilizing salts. With such an incombustible coating surrounding the peaty granules, it is possible to make use of nitrates either alone or preferably in admixture with ammonium sulfate or ammonium phosphate.

A suitable composition with this modification involved is illustrated by the following formula:

| | |
|---|---|
| Cement | 45 parts |
| Sodium nitrate | 10 " |
| Ammonium sulfate | 5 " |
| Potassium sulfate | 5 " |
| Double superphosphate | 12 " |
| Potassium carbonate | 3 " |
| Coated granular peat | 20 " |

The first five ingredients are incorporated as above set forth and then mixed with the peat. The mixture may be inoculated with nitrogen fixing bacteria so that when applied to the soil nitrogen is withdrawn from the air and rendered available as a plant food.

To overcome the disturbing effects of various toxic bodies which tend to accumulate in soils due to the decomposition of vegetation and improperly prepared fertilizers I introduce small amounts of antidotal bodies such as naphthylamin or preferably formates, preferably basic formate of calcium, in quantities of from one tenth to one hundredth per cent. or less, whereby the accumulation of plant poisons such as picolin, carboxylic acid, uvitonic acid and the like is prevented from exceeding the toxic limit. Thus it becomes unnecessary to provide for rotation of crops as the soil is kept at all times in a sweet innocuous condition, so that rotation offers no advantages other than that produced by selective absorption of fertilizing elements.

Another formula illustrative of my invention consists of:—

| | | |
|---|---|---|
| Double superphosphate | 150 | parts |
| Sodium nitrate | 200 | " |
| Potash sulfate | 150 | " |
| Hydrated lime | 100 | " |
| Portland cement | 400 | " |
| Kaolin-coated granular peat | 400 | " |
| Basic calcium formate | 1 | " |

The salts are incorporated with the cement and worked with water to the consistency of stiff putty, allowed to set and dry then mixed with the peat.

What I claim is:—

1. A fertilizer consisting of salts containing nitrogen, phosphorus and potash incorporated in a substantially granular form by Portland cement and admixed with granular lime-coated peat.

2. A fertilizer comprising salts containing nitrogen, phosphorus and potash incorporated in a substantially granular form by a cementing agent and admixed with granular lime-coated peat, and carrying a modicum of basic calcium formate.

3. A fertilizer comprising salts containing nitrogen, phosphorus and potash incorporated in a substantially granular form by a cementing agent and admixed with granular lime-coated peat, and carrying a modicum of a salt of formic acid.

4. A fertilizer comprising salts containing nitrogen, phosphorus and potash incorporated in a substantially granular form by cement, and admixed with granular lime-coated peat.

In testimony whereof I have affixed my signature in presence of two witnesses.

CARLETON ELLIS.

Witnesses:
NATHANIEL L. FOSTER,
FRANCES I. NEWMAN.